United States Patent [19]
Deparis et al.

[11] Patent Number: 5,247,958
[45] Date of Patent: Sep. 28, 1993

[54] SAFETY VALVE, ESPECIALLY FOR A FUEL TANK VENT PIPE

[75] Inventors: Eric Deparis, Perne/Roc; Serge Pergebois, Entrammes, both of France

[73] Assignee: Solvay & Cie, Brussels, Belgium

[21] Appl. No.: 877,379

[22] Filed: Apr. 29, 1992

Related U.S. Application Data

[63] Continuation of Ser. No. 697,012, May 8, 1991.

[30] Foreign Application Priority Data

May 11, 1990 [FR] France ............................ 90 06016

[51] Int. Cl.⁵ .............................................. F16K 17/36
[52] U.S. Cl. .......................................... 137/43; 251/24
[58] Field of Search ...................... 137/39, 43; 251/24

[56] References Cited

U.S. PATENT DOCUMENTS

| | | |
|---|---|---|
| 3,765,435 | 10/1973 | Schlanzky . |
| 4,095,609 | 6/1978 | Martin .................................. 137/43 |
| 4,779,637 | 10/1988 | Ubaldi .................................. 137/43 |
| 4,917,157 | 4/1990 | Gifford et al. . |

FOREIGN PATENT DOCUMENTS

340062 11/1989 European Pat. Off. .

OTHER PUBLICATIONS

*Scanning For Ideas*, Machine Design, vol. 55, No. 23, p. 64 (Oct. 1983).

Primary Examiner—Robert G. Nilson
Attorney, Agent, or Firm—Willian Brinks Olds Hofer Gilson & Lione

[57] ABSTRACT

The valve, mounted on a vent pipe, allows the passage of gas in both directions, but prevents any escape of liquid fuel. The valve comprises a closed containment 7 equipped with a lower inlet port 8 and with an upper outlet port 9 which are connected to the vent pipe, a stationary circular inner cup 10 kept spaced from the inner wall of the containment and from the inlet port, a vertically displaceable assembly surmounting the cup and comprising a float 13 and a needle 16 which is equipped with a gasket 17 and is fixed to the float and which, in the high position of the assembly, can close off the outlet port 9, and means 11, 14, 15 for causing an upward displacement of the assembly as a result of an inclination of the containment 7. Furthermore, the annular space between the cup 10 and the inner wall of the containment 7 is profiled so as to form a Venturi tube 18 which is kept in relationship via at least one passage 20 with the volume 19 located between the cup 10 and the base of the float 13.

7 Claims, 4 Drawing Sheets

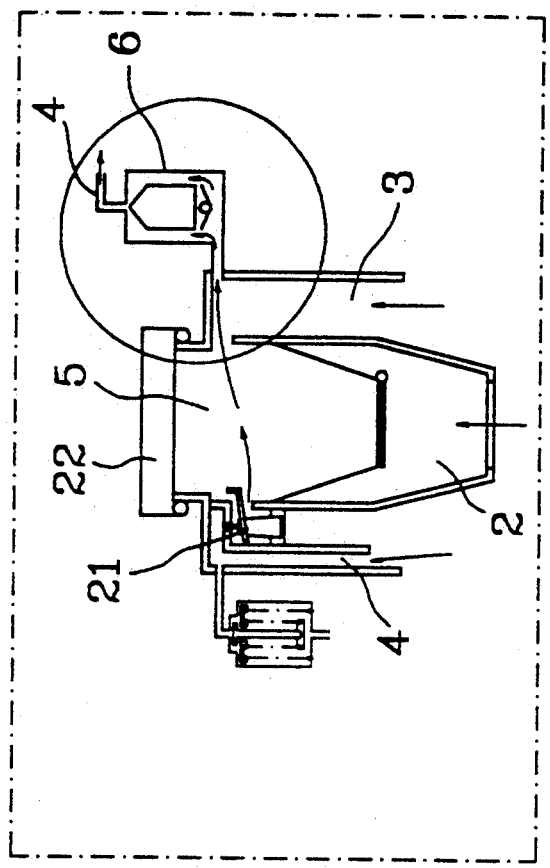
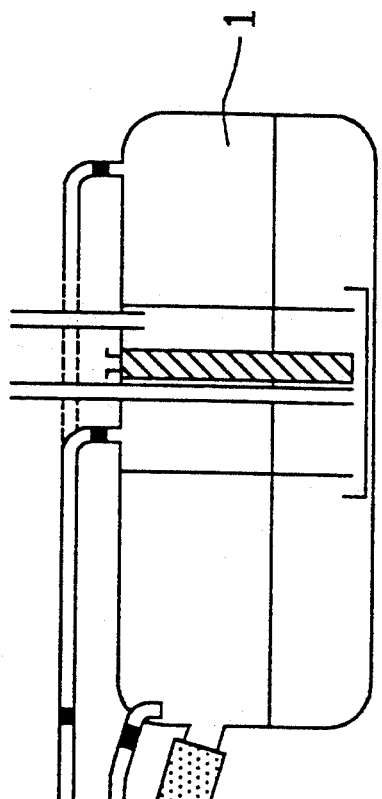
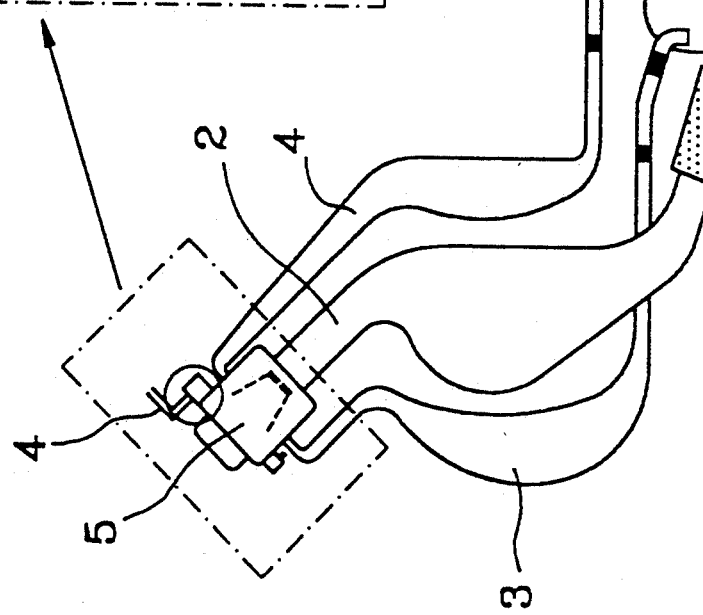
FIG. 1B
FIG. 1A

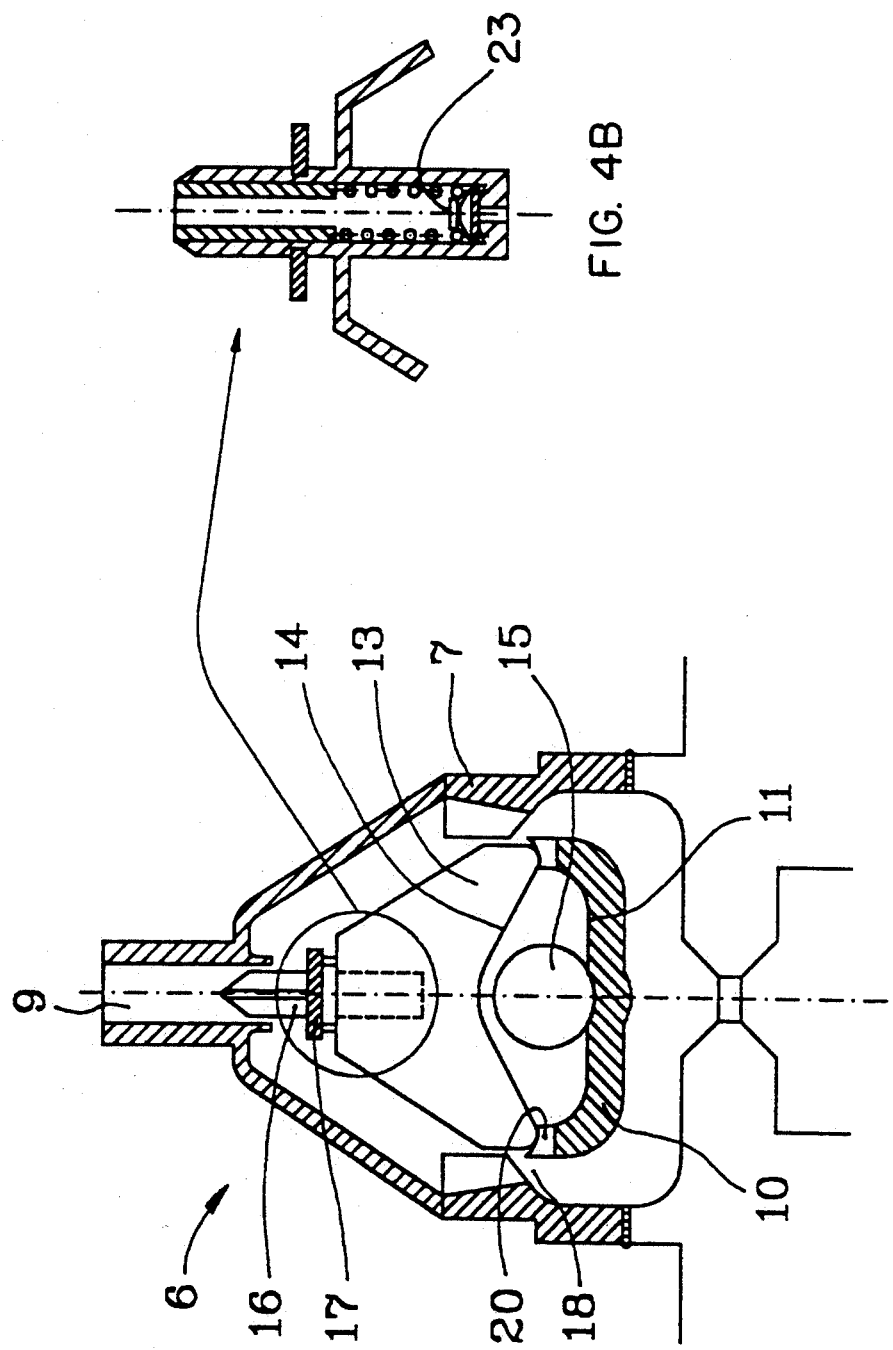

SAFETY VALVE, ESPECIALLY FOR A FUEL TANK VENT PIPE

This is a continuation of U.S. Ser. No. 097,012 filed May 8, 1991, now pending.

The present invention relates to a safety valve which is especially suitable for equipping the vent pipe of a fuel tank with which a motor vehicle is equipped.

At the present time, fuel tanks are generally equipped with, among other things, a vent pipe connected to the atmosphere directly or via a filter capacity usually called a canister. The functions of this latter pipe are, on the one hand, to allow the air to enter the tank freely so as to compensate the volume of fuel consumed (vacuum function) and, on the other hand, to make it possible to discharge excess fuel vapour from the tank to prevent this from being put under pressure (pressure function).

Moreover, during a filling of the tank, this pipe can be closed off in order to trap a volume of air in the upper part of the tank, so as to allow an expansion of the fuel after filling for the purpose of compensating its dilatation, for example under the effect of a temperature variation. To this effect, this pipe is usually produced in two parts, a first part connecting the tank to the filling mouthpiece of the tank and a second part connecting this mouthpiece to the atmosphere.

Thus, the second part of the pipe can also make it possible to discharge the fuel vapour emitted from the tank during filling via the filling pipe and the degassing pipe.

Furthermore, it is thereby possible to provide, in the mouthpiece of the filling pipe, a valve system allowing the first part of the vent pipe to be closed off during a filling of the tank.

For safety reasons, it is obviously expedient that the second part of the vent pipe be incapable of allowing the passage of liquid fuel under any circumstances (an accident changing the centre of gravity of the vehicle, obstruction of the tank, etc).

The object of the present invention is, therefore, to provide a safety valve which can equip the second part of the vent pipe and which allows the latter to perform the desired functions, whilst at the same time preventing any risk of discharge of liquid fuel.

The invention therefore relates to a safety valve, especially for a fuel-tank vent pipe, which prevents the passage of liquid fuel and comprises a closed containment equipped, in its lower part, with an inlet port connected to the vent pipe and, in its upper part, with an outlet port likewise connected to the vent pipe, characterised in that:

a) the lower part of the containment comprises a stationary circular inner cup kept spaced from the inner wall of the containment and from the lower inlet port, b) the cup is surmounted by a vertically displaceable assembly comprising a float of general frustoconical or spherical shape and an upper needle fixed to the float and which, in the high position of the assembly, can close off the outlet port of the containment, means being provided, where appropriate, for causing an upward displacement of the assembly as a result of an inclination of the containment, c) the space between the inner wall of the containment and the cup is profiled so as to define an annular passage in the form of a Venturi tube which is kept in relationship via at least one passage with the volume located between the cup and the float of the assembly, in such a way that the passage of the fuel vapours into this space causes this volume to be put under a vacuum.

The closed containment can have any shape, but it is generally preferable if it is produced in two parts, the lower part having a general hemispherical shape and being connected to an upper part of general frustoconical shape.

The cup, of general circular shape and of a diameter smaller than the inside diameter of the containment in the region of its installation, is kept in place by wings for fastening to the inner wall of the containment or by any other means. As will be explained later, the inner face of the cup can be either of conical profile or of substantially plane profile, in the latter case a spherical indentation being provided at its centre.

Preferably, the centres of the inlet and outlet ports of the containment and the centre of the cup are coaxial.

The containment, the cup and the vertically displaceable assembly can be produced from any material, but it is generally preferable if these are made from thermoplastics. In this case, of course, it is expedient to select these in such a way that they withstand the operating stresses. In particular, the chosen materials must obviously be inert in relation to fuels.

Thus, for example, it has been found that the two component elements of the containment can advantageously be produced by injection-moulding from polyolefines.

The float, of a general frustoconical shape similar to that of the upper part of the containment, can be closed and hollow or be produced from an expanded thermoplastic preferably of the closed-cell type.

The needle fixed to the float is preferably tubular and arranged coaxially in relation to the outlet port, so as to engage into this port in the high position of the assembly and be as it were guided by this port. In this case, the outside diameter of the needle corresponds substantially to that of the port. The needle is generally equipped, on its periphery, with a gasket, for example with a diaphragm gasket made from a fluorinated elastomer, which, in the high position of the needle, ensures that the outlet port is closed off.

Furthermore, the needle can advantageously be equipped with a relief valve in order to afford additional safety.

The means for causing an upward displacement of the assembly consisting of the float and of the needle as a result of an inclination of the containment can be of any kind.

According to a first possible alternative embodiment, the displacement is obtained by means of a ball made of metal, such as steel, or of another material, such as glass, and arranged in the cup of conical inner profile, the lower part of the float of the movable assembly being capable of bearing on this ball.

According to another possible alternative embodiment, the displacement is likewise obtained by means of a ball which is arranged in the cup, this time being of substantially plane profile and preferably being equipped at its centre with a spherical indentation receiving the said ball, the lower part of the float being capable of bearing on this ball and being profiled in the form of an inverted cone. In this alternative embodiment, the dimensions of the spherical indentation of the cup are such as to stabilise the ball at the centre of the cup so as to prevent inopportune closures of the valve in response to normal inclinations of the containment or as a result of the effect of centrifugal force, for example when the vehicle negotiates a bend.

The profiling in the form of a Venturi tube of the annular space between the inner wall of the containment and the cup can be located anywhere along the outer wall of the cup, but it is generally preferable if it is located in the region of the upper edge of the cup. In this latter case, the passages for putting into relationship with the volume located between the cup and the float of the assembly consist of indentations cut and distributed in the wall of the edge of the cup. The passages can also consist of perforations made and distributed annularly in the wall of the cup or on the base of the float.

Moreover, the safety valve according to the invention and its operation are explained by the figures of the accompanying drawings in which:

FIG. 1A is a general view of a fuel tank for a motor vehicle, and

FIG. 1B is an enlargement of a section of FIG. 1A

Figure 3:
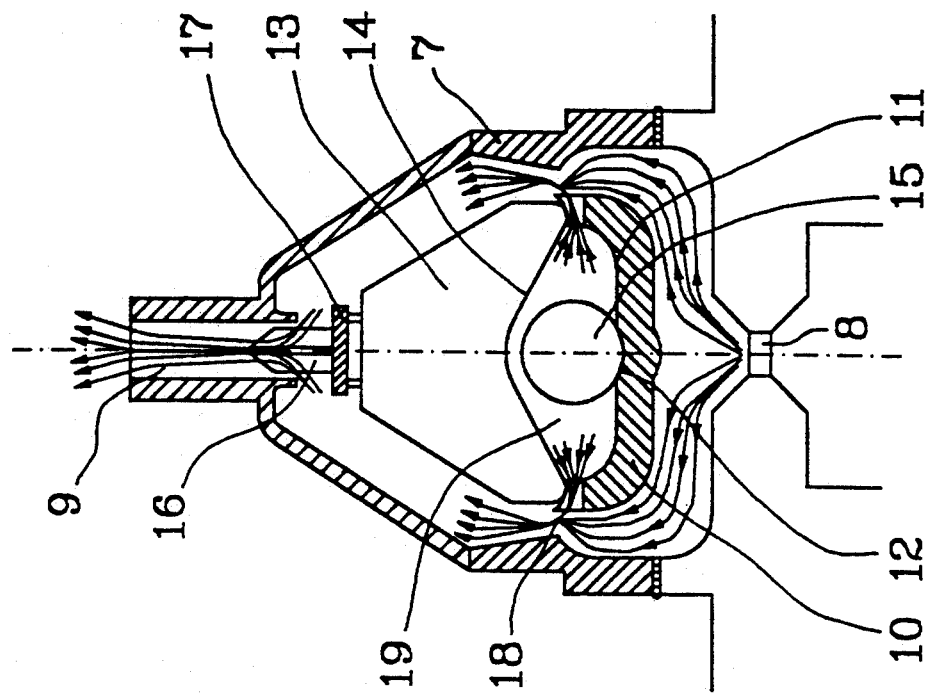
Figure 2:
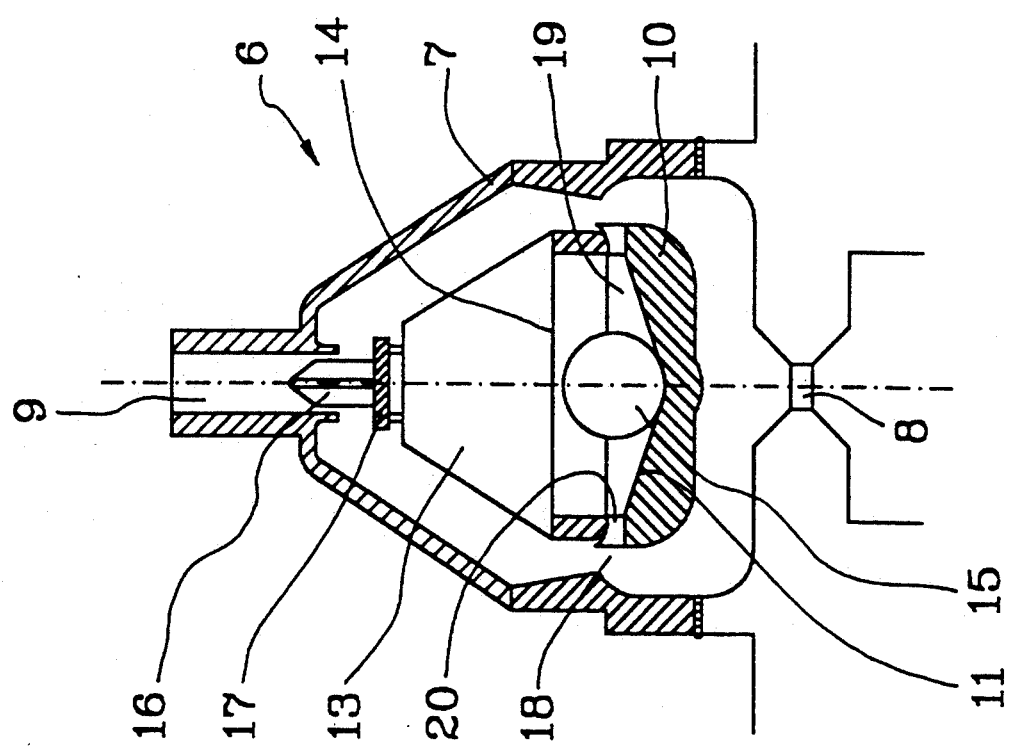
Figure 8:
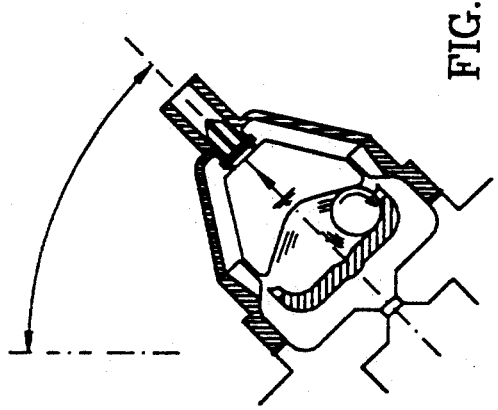
Figure 9:
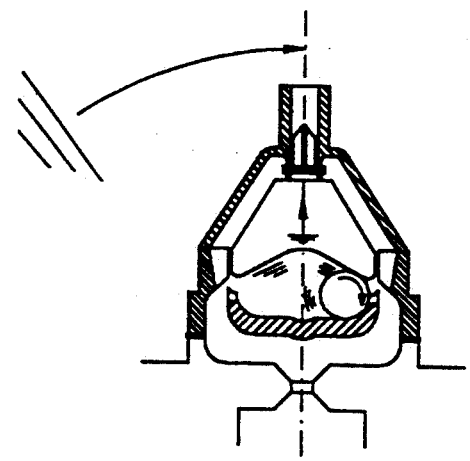

FIG. 2 is a sectional view of a first embodiment of a safety valve according to the invention, FIG. 3 is a sectional view of another embodiment of a safety valve according to the invention, FIG. 4A is a sectional view of a safety valve which is identical to that of FIG. 3 and the needle of which is equipped with a relief valve, and FIG. 4B is an enlargement of a section of FIG. 4A FIGS. 5 to 9 show different operating situations of a safety valve according to FIG. 3.

As emerges from FIG. 1A, the tank 1 of a motor vehicle comprises a filling pipe 2 equipped with a closable mouthpiece 5, a degassing pipe 3 connected to the mouthpiece 5 and a vent pipe 4, of which a fist part is likewise connected to the mouthpiece 5 and a second connects this mouthpiece to the atmosphere directly or via a recovery canister (not shown). FIG. 1B shows the customary positioning of the safety valve 6 according to the invention (shown diagrammatically). Furthermore, it will be seen from FIG. 1B that the second part of the vent pipe picks up not only the fluids flowing in the first part, but also the fluids flowing through the degassing pipe 3 and the filling pipe 2. Finally, FIG. 1B shows diagrammatically a valve system 21, the function of which is to close off the first part of the vent pipe 4 when the cap 22 is removed for the purpose of filling the tank 1.

As emerges more particularly from FIGS. 2 to 4A, the safety valve according to the invention comprises an outer containment 7 equipped, at its base, with an inlet port 8 and, in its upper part, with an outlet port 9. Arranged in this containment is a stationary circular cup 10 which is kept spaced from the inner wall of the containment 7. According to a first embodiment (FIG. 2), the inner wall 11 of the cup 10 is of conical profile, and according to a second embodiment (FIG. 3) the inner wall 11 of the cup is plane and equipped at its centre with a spherical indentation 12.

The containment 7 also contains a vertically displaceable assembly comprising a float 13 which is hollow (FIG. 2) or which is made of cellular plastic (FIG. 3). In the normal position, the float rests on the edge of the cup 10. According to the first alternative embodiment, the base 14 of the float 13 is plane (FIG. 2), and according to the second version (FIG. 3) this base 14 is profiled in the form of an inverted cone. A ball 15 of sufficient diameter is disposed in the cup 10. In the second embodiment, the function of the spherical indentation 12 is to stabilise the ball 15 at the centre of the cup and prevent an inopportune displacement of this ball under the effect of a slight inclination of the containment or as a result of inertia, for example when there is a normal change in the path of the motor vehicle.

The float 13 is equipped, in its upper part, with a needle 16 which, in the high position of the float, closes off the upper port 9 of the containment 7 by means of a diaphragm gasket 17. FIG. 4A shows a safety valve identical to that of FIG. 3. As shown in FIG. 4B, if appropriate the needle can be equipped with a relief valve 23.

Moreover, it emerges that the annular space between the inner wall of the containment 7 and the cup 10 is profiled so as to form a Venturi tube 18. This Venturi tube is kept in relationship with the volume 19 located between the cup 10 and the base of the float 13 via passages consisting of indentations 20 cut in the edge of the cup 10 and distributed along this edge.

A emerges more particularly from FIGS. 3 and 5 to 9, the safety valve according to the invention allows the vent pipe to perform its functions perfectly and closes this pipe reliably whenever there is a possible risk of causing an unwanted escape of liquid fuel.

Figure 6:
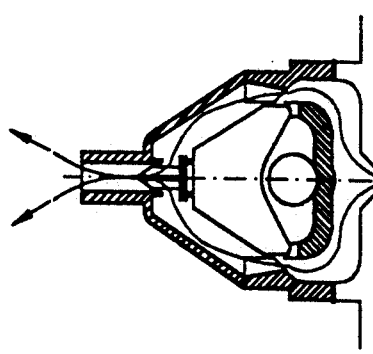

As shown in FIGS. 3 and 6, in a normal situation the safety valve makes it possible to discharge the fuel vapours. In this case, the vacuum generated in the volume 19 contributes effectively to keeping the float in the low position, in spite particularly of its lightness, thus making it possible to obtain very high discharge rates without the risk that the port 9 will be closed off.

Figure 5:
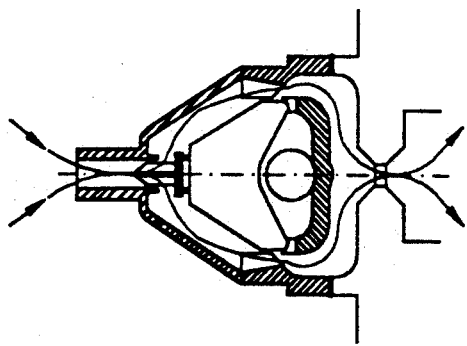

Furthermore, as emerges from FIG. 5, in a normal situation the valve allows air to return to the tank in order to compensate the fuel consumed.

Figure 7:
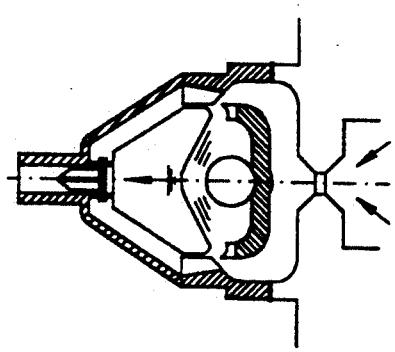

In contrast, as emerges from FIG. 7, in the event that liquid fuel rises via the vent pipe, the fuel entering the containment drives the float 13 upwards and consequently ensures that the outlet port 9 is safely closed off.

Finally, when there is an abnormal inclination of the containment, for example as the result of an accident, the ball 15 is displaced by gravity in the cup 10 and likewise causes the float 13 to rise and therefore the outlet port 9 to be closed off safely.

We claim:

1. Safety valve, especially for a fuel-tank vent pipe, which prevents the passage of liquid fuel and comprises a closed containment equipped, in its lower part, with an inlet port connected to the vent pipe and, in its upper part, with an outlet port likewise connected to the vent pipe, and in which:

a) the lower part of the containment comprises a stationary circular inner cup kept spaced from the inner wall of the containment and from the lower inlet port, and b) the cup is surmounted by a vertically displaceable assembly comprising a float of general frustoconical or spherical shape and an upper needle which is fixed to the float and which, in the high position of the assembly, can close off the outlet port of the containment, means being provided, for causing an upward displacement of the assembly as a result of an inclination of the containment, characterised in that the space between the inner wall of the containment and the cup is profiled so as to form a Venturi tube which is kept in relationship via at least one passage with the volume located between the cup and the float of the assembly, in such a way that the passage of the fuel vapours into this space causes this volume to be put under a vacuum.

2. Safety valve according to claim 1, characterised in that the means for causing the upward displacement of the assembly as a result of an inclination of the containment consists of a ball which is arranged in the cup, the cup having a conical inner profile, the lower part of the float of the movable assembly being capable of bearing on this ball.

3. Safety valve according to claim 1, characterised in that the means for causing the upward displacement of the assembly as a result of an inclination of the containment consists of a ball which is arranged in the cup, the cup having a plane inner profile equipped at its centre with a spherical indentation, the lower part of the float of the assembly being capable of bearing on this ball and being profiled in the form of an inverted cone.

4. Safety valve according to claim 1, characterised in that the passage consists of a space maintained between the edge of the cup and the lower part of the hollow base of the assembly.

5. Safety valve according to claim 1, characterised in that the needle is equipped with a diaphragm gasket such that the maximum leakage from 0 to 10 kPa is 0.005 l/min.

6. Safety valve according to claim 1, characterised in that the needle is equipped with a relief valve.

7. Safety valve according to claim 1, characterised in that the containment, the cup and the assembly are produced from plastic.

* * * * *